United States Patent [19]

Noguchi

[11] Patent Number: 4,701,005

[45] Date of Patent: Oct. 20, 1987

[54] LIGHT BEAM COMBINING METHOD AND APPARATUS

[75] Inventor: Masaru Noguchi, Kanagawa, Japan

[73] Assignee: Fuji Photo Film Co., Ltd., Nakanuma, Japan

[21] Appl. No.: 673,236

[22] Filed: Nov. 19, 1984

[30] Foreign Application Priority Data

Nov. 18, 1983 [JP] Japan ............... 58-216334

[51] Int. Cl.$^4$ .................. G02B 5/32; G02B 26/10
[52] U.S. Cl. .................. 350/3.7; 350/3.71; 350/3.72; 350/3.73
[58] Field of Search .............. 350/3.7, 3.71, 3.72, 350/3.73

[56] References Cited

U.S. PATENT DOCUMENTS

| | | | |
|---|---|---|---|
| 3,619,023 | 11/1971 | Brooks | 350/3.7 |
| 3,743,376 | 7/1973 | Russell | 350/3.73 |
| 4,054,356 | 10/1977 | Noguchi | 350/3.72 |
| 4,148,549 | 4/1979 | Termanis | 350/3.7 |
| 4,312,559 | 1/1982 | Kojima et al. | 350/3.72 |
| 4,355,858 | 10/1982 | Funato et al. | 350/3.72 |
| 4,393,126 | 7/1983 | Kojima et al. | 350/3.72 |
| 4,416,505 | 11/1983 | Dickson | 350/3.71 |
| 4,447,111 | 5/1984 | Leib | 350/3.7 |
| 4,465,332 | 8/1987 | Horner et al. | 350/3.7 |

FOREIGN PATENT DOCUMENTS

| | | | |
|---|---|---|---|
| 0041845 | 12/1981 | European Pat. Off. | 350/3.71 |
| 0077715 | 6/1980 | Japan | 350/3.71 |
| 0161581 | 12/1981 | Japan | 350/3.72 |

OTHER PUBLICATIONS

Ludman, "Holographic Solar Concentrator", *Applied Optics*, vol. 21, No. 17, Sep. 1982, 3057–8.

*Primary Examiner*—John K. Corbin
*Assistant Examiner*—D. Edmondson
*Attorney, Agent, or Firm*—Sughrue, Mion, Zinn, Macpeak & Seas

[57] ABSTRACT

A plurality of light beams emitted by a plurality of light sources are combined together to obtain a power-multiplication effect of the beams by use of a holographic diffraction grating. The holographic diffraction grating diffracts a plurality of light beams incident thereto into such directions that the diffracted light beams advance in parallel to one another or are collimated, advance toward a point or converge, or advance as if they were emitted from a point or diverge so that the diffracted light beams can be focused to a point by use of or without a focusing optical system to multiply the power of the beams in effect. The holographic diffraction grating may be of area division type which diffracts the light beams at different portions thereof or of a multiple type which diffracts the light beams at the same portion thereof. By the former type holographic diffraction grating a single combined light beam in which the original light beams are fully merged into a single light beam is obtained, and by the latter type grating the original light beams are diffracted into collimated, converging or diverging beams.

12 Claims, 25 Drawing Figures

LIGHT BEAM COMBINING METHOD AND APPARATUS

BACKGROUND OF THE INVENTION

1. Field of the Invention

This invention relates to a method of combining light beams emitted by a plurality of light sources to obtain a power-multiplication effect, and an apparatus for carrying out the method. More specifically, this invention relates to a method of and apparatus for combining a plurality of light beams into a single light beam or into collimated, converging or diverging light beams which can be simply focused to a point by use of or without a focusing optical system to effect power multiplication of the beams at the point.

This invention is applicable to any laser beam utilizing system in which power multiplication of a laser beam or beams is desired such as a laser beam scanning system, laser communication system, laser processing system, etc. Particularly, this invention is suitable for obtaining a scanning light beam for use in an optical scanning apparatus for reading out information recorded in a recording medium or for recording the information in the recording medium by scanning the recording medium by the light beam.

2. Description of the Prior Art

Recently, a need has arisen for a light beam having large light power in various technical fields. For example, in an optical scanning apparatus for reading out information recorded in a recording medium or for recording the information on the recording medium by scanning the recording medium by a substantially monochromatic light beam, if light power on the scanning surface could be increased, it would become possible to increase the read-out or recording speed. Further, in a laser communication system, the power increase is desired to improve the S/N ratio or elongate the possible distance of communication. In a laser processing system for processing workpieces, the power increase is desired to increase the processing speed or the processing power.

One approach to the increase in light power of a light beam is to increase the power of the light source for generating the light beam. However, in this approach, the light source inevitably becomes large. Further, in spite of the enlarged scale of the power source, the light power cannot be so much increased. Also, in the case where a semiconductor laser is used for obtaining a scanning light beam, it is necessary to apply a large current to the laser to increase light power, and as a result, the expected life span of the laser source becomes short. Therefore, the degree of increase in light power is limited in this approach. Accordingly, a method of increasing light power of a light beam by combining two light beams emitted by two light sources has heretofore been used widely. For instance, it has been known to have P-polarized light beam and S-polarized light beam merged into a single light beam by use of a polarization beam splitter such as a Glan-Thompson prism, or to have ordinary rays and extraordinary rays merged together by utilization of the double refraction property of a Rochon prism and a Wollaston prism.

However, in the aforesaid methods, only two light beams can be combined, and it is impossible to combine three or more light beams together. Therefore, the degree of increase in light power is naturally limited.

SUMMARY OF THE INVENTION

The primary object of the present invention is to provide a method of combining a plurality of light beams together, in which three or more light beams are merged into a single light beam to obtain a light beam having multiplied light power or collimated, converged or diverged so as to simply be focused to a point to multiply the power in effect.

Another object of the present invention is to provide a method of combining light beams, in which light beams of low monochromaticity are combined into a light beam of high monochromaticity.

The specific object of the present invention is to provide a method of combining light beams, which makes it possible to provide a small, economical, high-power and/or high-speed optical scanning apparatus.

A further object of the present invention is to provide an apparatus for carrying out the above method.

The aforesaid objects are accomplished by combining a plurality of light beams together by use of a holographic diffraction grating.

In the present invention, the holographic diffraction grating embraces a multiple type holographic diffraction grating and an area division type holographic diffraction grating.

In the present invention, not only two light beams but also three or more light beams can be combined together to increase light power to a markedly higher extent than in the conventional method.

In the present invention, a plurality of light beams are combined together in such a way that all the light beams are fully merged into a single high power light beam of the same diameter as that of the original light beams, or collimated, converged or diverged so that they may be simply focused to a point or an area with or without a focusing optical system to effect power multiplication at the point. It should be noted that the expression of "combining" or "combination " of light beams should be interpreted to cover all the variations as described above.

Also, even when light emitting diodes or the like which exhibit low monochromaticity are used as the light sources, it is possible to easily obtain a light beam of high monochromaticity by virtue of the excellent wavelength selectivity of the holographic diffraction grating.

Further, since the holographic diffraction grating can be made by a photographic process or the like, it is adapted to mass-production, and it is possible to obtain a light beam of large light power at a low cost.

When the method and apparatus of the present invention are used in an optical scanning apparatus, it becomes possible to obtain a small, high-speed optical scanning apparatus.

DESCRIPTION OF THE PREFERRED EMBODIMENTS

The present invention will hereinbelow be described in further detail with reference to the accompanying drawings.

FIGS. 1 to 20 show various variations of the light diffracting performance of the holographic diffracting grating employed in the light beam combining method in accordance with the present invention.

Figure 8:
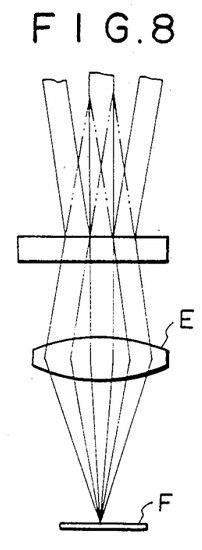
Figure 9:
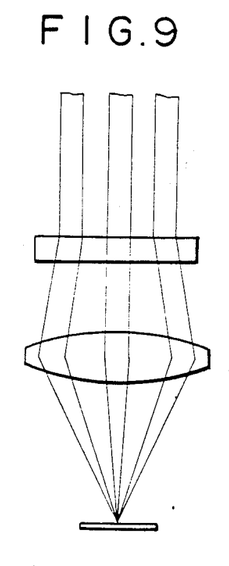
Figure 10:
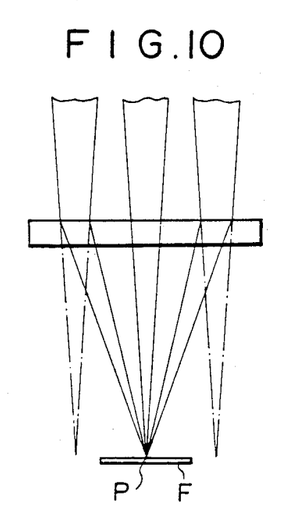
Figure 11:
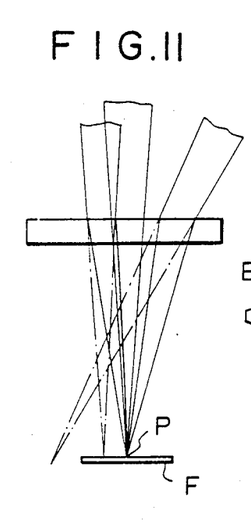
Figure 12:
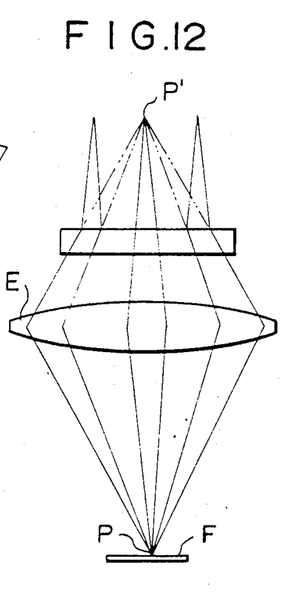

FIGS. 1 to 12 show examples in which the holographic diffraction grating (hereinafter referred to simply as "hologram") performs only to diffract the light beams incident thereto. Among them, in FIGS. 1 to 9, the light beams incident to the hologram are all collimated light beams though one light beam may not be in parallel to another. In FIGS. 10 and 11, the incident light beams are all converging light beams converging to different points. In FIG. 12, the incident light beams are diverging light beams diverging from different points.

FIGS. 13 to 17 show examples in which the hologram performs to coverge the light beams incident thereto as well as diffract them.

Figures 18, 19, 20:
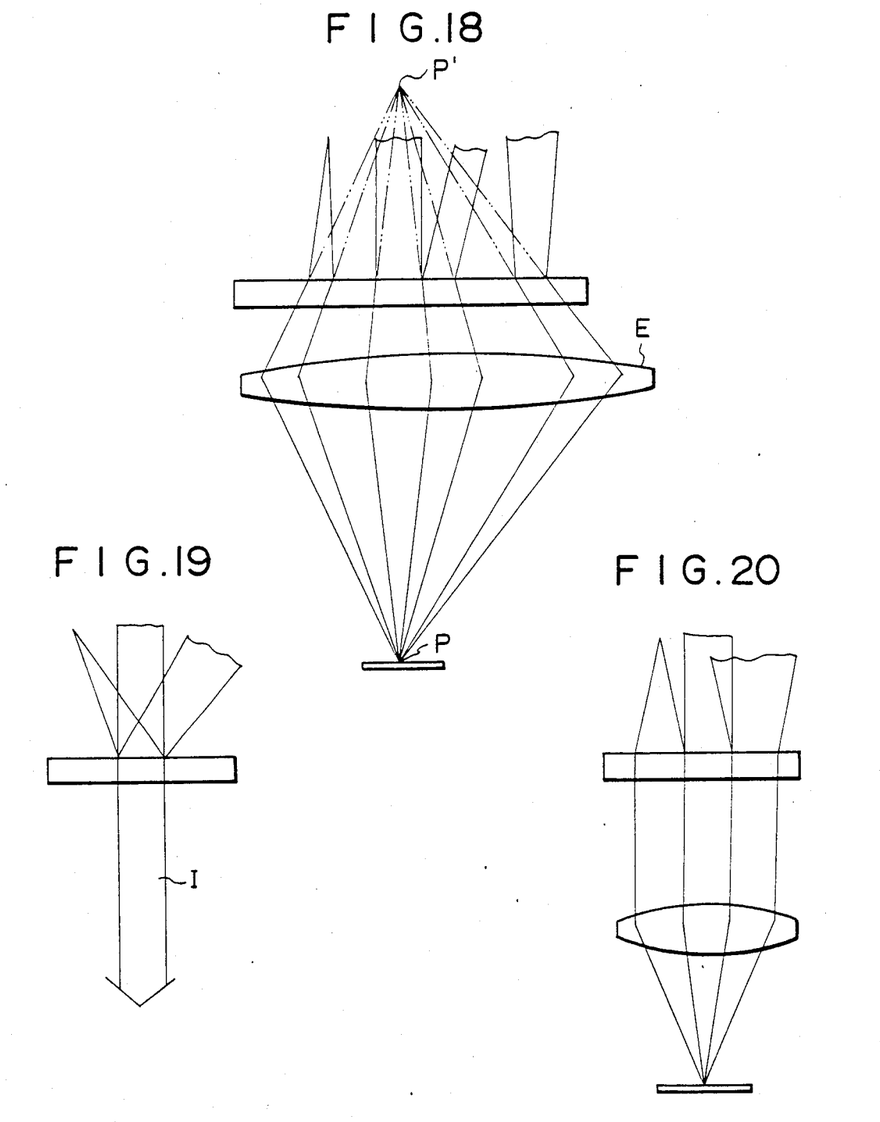

FIG. 18 shows an example in which the hologram performs to diverge the light beams incident thereto as well as diffract them.

FIGS. 19 and 20 show examples in which one of the light beams incident to the hologram is simply diffracted, another is coverged and the other is diverged.

Now the respective examples will be explained in detail referring to FIGS. 1 to 20. These examples are only a few of the possible variations of the performance of the holograms which can be employed in the present invention. However, from these examples, it will be possible for any person skilled in the art to understand the basic concept of the invention and think of other examples covered by the scope of the present invention.

Figure 1:
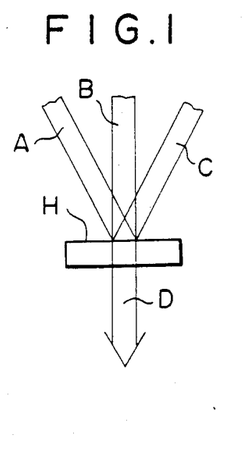
FIGS. 1 to 20 show various variations in the light diffracting performance of the holographic diffracting grating which is usable in the present invention.

FIG. 1 shows an example in which three collimated light beams A, B and C are incident to the same portion of a hologram H and deflected by diffraction into the same direction so that the three light beams may be fully merged together into a single power-multiplied light beam D. The power-multiplied light beam D is only diffracted and not converged or diverged by the hologram and accordingly is also collimated so that it may simply be focused to a point by a converging lens system.

Figure 2:
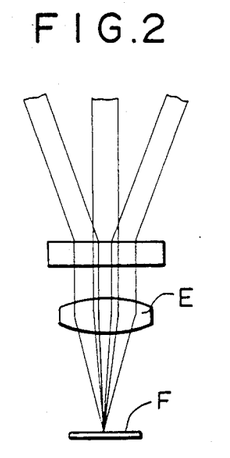

FIG. 2 shows an example in which three collimated light beams are diffracted in the same direction being partly overlapped with each other, namely collimated as a whole so that the diffracted light beams may be simply focused to a point on an object F by use of a converging lens E.

Figure 3:
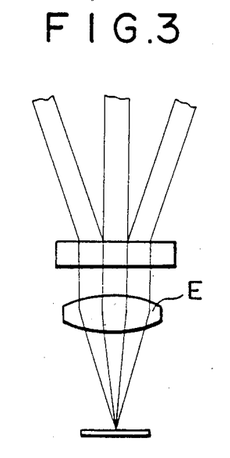

FIG. 3 shows an example in which three collimated light beams are incident to the hologram in the areas adjacent to each other and the diffracted light beams are caused to advance in parallel to each other in side-by-side relationship. Therefore, the diffracted collimated light beams can be simply focused by use of a converging lens E.

Figure 4:
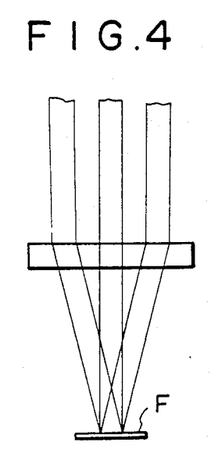

FIG. 4 shows an example in which three parallel collimated light beams are incident to different portions of the hologram of area division type and are diffracted toward a common part on an object F, namely converged as a whole to a point on the object. The diffracted light beams are not converged respectively but are converged as a whole as shown.

Figure 5:
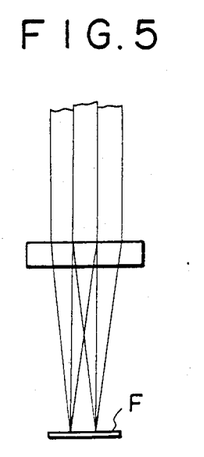

FIG. 5 shows an example in which three parallel collimated light beams are incident to the different portions of the hologram adjacent to each other and are diffracted toward a common part on an object F. This example is different from that shown in FIG. 4 only in the position of the diffracting portions of the hologram to which the light beams are incident.

Figure 6:
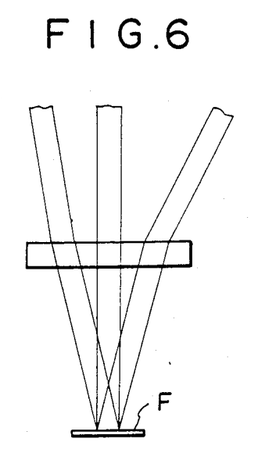

FIG. 6 shows an example in which three collimated light beams are incident to the hologram in various directions at random and are diffracted toward a common part of an object F. This example indicates that the incident light beams may not be directed to a point but may advance in random directions.

Figure 7:
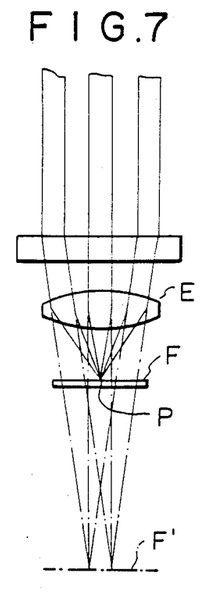

FIG. 7 shows an example in which three parallel collimated light beams are diffracted toward a common point on an imaginary object F' similarly to the example shown in FIG. 4 but are then focused to another point P on an object F. In this example, the diffracted light beams are not converged respectively, but are converged as a whole and then coverged respectively by a converging lens E.

FIG. 8 shows an example in which three light beams respectively collimated but converged as a whole are incident to a hologram at different portions adjacent to each other and are diffracted into diverging directions as if emitted from a common area, and then focused to a point on an object F by use of a converging lens E.

FIG. 9 is similar to FIG. 8 wherein the three incident light beams are parallel to each other and incident to isolated different portions of a hologram.

In the above-described examples, the incident light beams are all collimated light beams. However, the incident light beams may be converging light beams as shown in FIGS. 10 and 11 or may be diverging light beams as shown in FIG. 12.

FIG. 10 shows an example in which three parallel coverging light beams are diffracted by the hologram toward a point P on an object F. In this example, no lens is needed to focus the diffracted light beams.

FIG. 11 shows an example in which three converging light beams are incident to the hologram in various directions at random, and the diffracted light beams are directed and focused to a common point P on an object F.

FIG. 12 shows an example in which three parallel diverging light beams are incident to the hologram and then diffracted in the diverging directions as if they were emitted from a point P'. The diffracted diverging light beams are then focused to a point P on an object F by use of a focusing lens E.

In the above-described examples, the incident light beams are all simply diffracted by the hologram. The hologram, however, may have a function to converge the light beams so that the light beams collimated or diverged when incident to the hologram may be focused thereby to a point without a converging lens. Such examples are illustrated in FIGS. 13 to 18.

Figure 13:
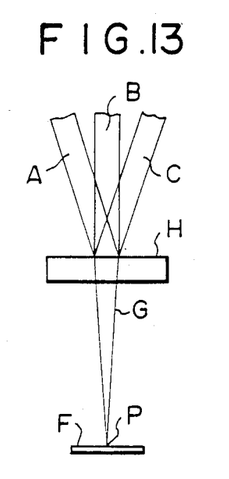

FIG. 13 shows an example in which three collimated light beams A, B and C incident to the same portion of the hologram H are diffracted and focused to a common point P on an object F in the form of a single fully merged converging light beam G.

Figure 14:
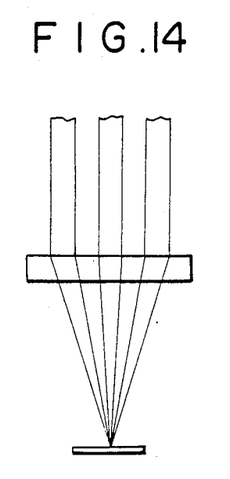

FIG. 14 shows an example in which three parallel collimated light beams are diffracted and focused to a point by the hologram.

Figure 15:
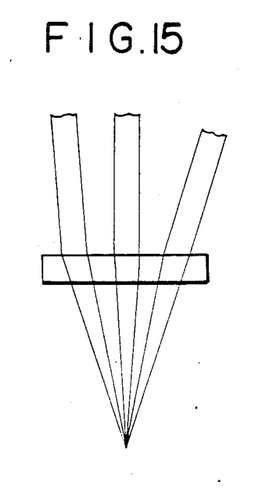

FIG. 15 shows an example in which three incident light beams advancing in the various directions at random are diffracted and focused to a point by the hologram.

Figure 16:
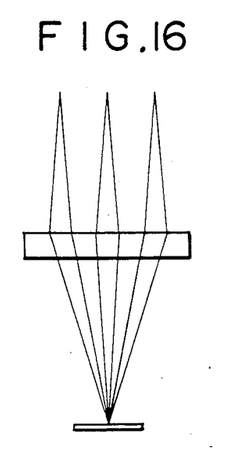

FIG. 16 shows an example in which three parallel diverging light beams are diffracted and focused to a point by the hologram.

Figure 17:
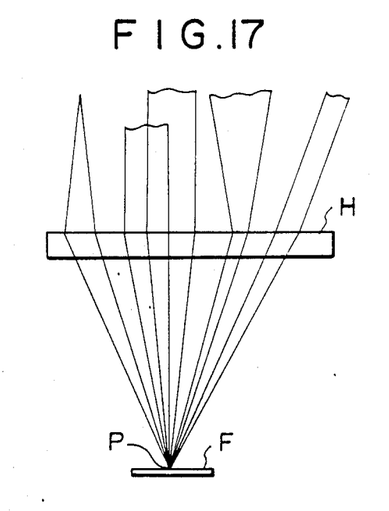

FIG. 17 shows an example in which various kinds of incident light beams, some diverging, some converging and some collimated, are diffracted and focused to a point P on an object F by the hologram H.

FIG. 18 shows an example in which various kinds of incident light beams are diffracted and diverged as if emitted from a point P' and then focused to a point P by use of a converging lens E.

FIGS. 19 and 20 show further examples in which various incident light beams are collimated by the hologram.

FIG. 19 shows an example in which three different kinds of light beams incident to the same portion of the hologram are diffracted into the same direction so that the diffracted light beams may be fully merged together into a single power-multiplied collimated light beam. The collimated light beam I can be simply focused to a point by use of a converging lens.

FIG. 20 shows an example in which three different kinds of light beams incident to different areas of the hologram adjacent to each other are diffracted into the same direction so that the diffracted light beams may advance in parallel to each other in side-by-side relationship and then can be focused to a point by use of a converging lens.

It will be noted that among the above described various variations the examples in which the diffracted light beams are merged into a single light beam as shown in FIGS. 1, 13 and 19 are most suitable for light scanning systems wherein the power-multiplied light beam is deflected to scan on an object. Secondly, the examples in which the diffracted light beams are collimated as shown in FIGS. 2, 3 and 20 are suitable to the light scanning systems. This is because the light scanning system employs a light beam deflector such as a galvanometer mirror or a polygonal rotating mirror and the diffracted power-multiplied light beam or beams must be deflected thereby, and if the power-multiplied light beam or beams are composed of a plurality of light beams not fully merged they cannot be deflected in exactly the same conditions or in exactly the same optical path length.

Now, the invention will be described with reference to more specific embodiments thereof referring to FIGS. 21 to 25.

Figure 21:
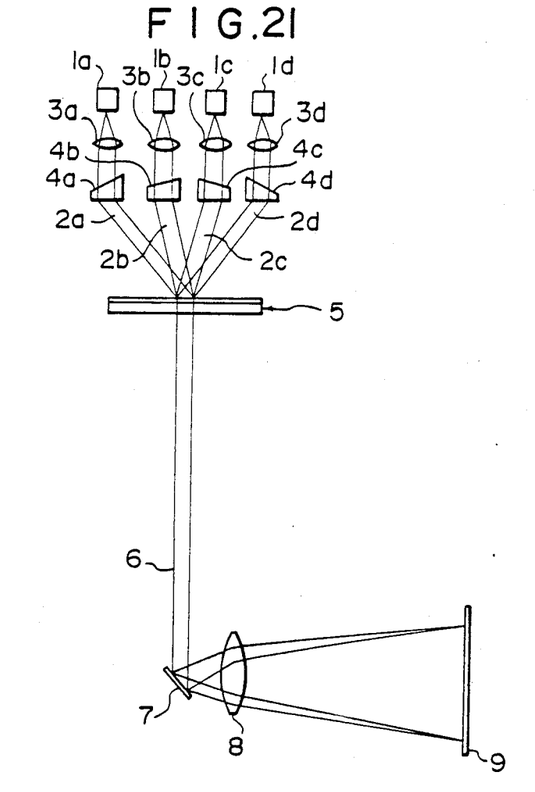
FIG. 21 is a schematic view showing an optical scanning apparatus wherein an embodiment of the light beam combining apparatus in accordance with the present invention is employed.

FIG. 21 schematically shows an optical scanning apparatus wherein an embodiment of the light beam combining apparatus in accordance with the present invention is employed. Light beams 2a to 2d emitted by substantially monochromatic point sources 1a to 1d composed of laser diodes or light emitting diodes are respectively converted by collimator lenses 3a to 3d into parallel rays of light. Then, the directions of the light beams 2a to 2d are adjusted by beam direction adjusting prisms 4a to 4d so that the light beams 2a to 2d impinge upon the same area of a hologram 5. The hologram 5 is a multiple type hologram, and the light beams 2a to 2d impinging upon the same area of the hologram 5 are diffracted thereby so that they are emitted therefrom as a single fully merged collimated light beam 6.

The light beam 6 thus obtained is deflected at a predetermined angular velocity by a light deflector 7 constituted by a galvanometer mirror, polygonal rotating mirror, a holographic scanner, or an ultrasonic light deflector. The deflected light beam 6 passes through a scanning lens 8 such as an f$\theta$ lens and impinges upon a recording medium 9 so that the recording medium 9 is scanned by the light beam 6.

Figure 22:
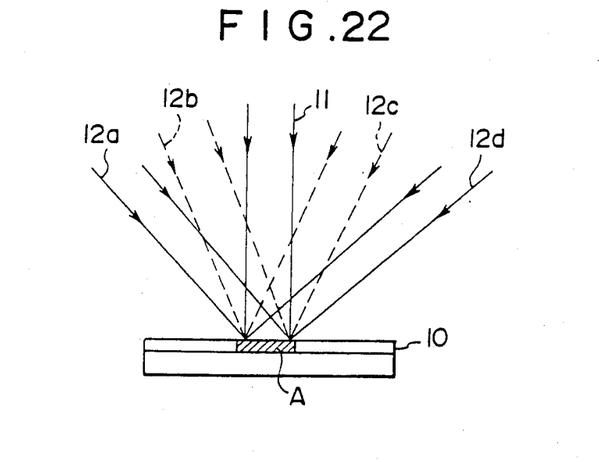
FIG. 22 is a schematic view showing the method of making the multiple type holographic diffraction grating in FIG. 21.

The multiple type hologram 5 can be made by a method as shown in FIG. 22. Two light beams 11 and 12a coherent with each other are caused to impinge upon a region A of a holographic recording material 10 at predetermined incident angles. Thus interference fringes caused by interference between the plane waves of the light beams 11 and 12a are generated at the region A, and the holographic recording material 10 is exposed to the interference fringes. The holographic recording material 10 has a thickness sufficiently large as compared with the period of the interference fringes, and the interference fringes are three-dimensionally recorded in the region A. In the same manner, light beams 11 and 12b coherent with each other, light beams 11 and 12c coherent with each other, and then light beams 11 and 12d coherent with each other are respectively caused to impinge upon the region A of the holographic recording material 10 at predetermined incident angles, thereby recording the respective interference fringes in the region A. Thereafter, the holographic recording material 10 carrying the interference fringes recorded therein is subjected to a development processing to obtain the multiple type hologram 5. When the wavelengths of the light beams 11 and 12a to 12d are identical with those of the light beams 6 and 2a to 2d in FIG. 21 and the thickness of the holographic recording material 10 is not changed by the development processing, the incident angle of the light beam 11 is adjusted to be aligned with the direction in which the diffracted light beam 6 is emitted from the hologram 5. Also, the incident angles of the light beams 12a, 12b, 12c, and 12d are likewise adjusted to the respective incident angles of the light beams 2a, 2b, 2c, and 2d on the hologram 5. In the case where the wavelengths of the light beams 11 and 12a to 12d are identical with those of the light beams 6 and 2a to 2d in FIG. 21 but the thickness of the holographic recording material 10 is changed by the development processing, the degrees of inclination of the interference fringes within the holographic recording material 10 change. Therefore, in this case, it is necessary to deviate in advance the incident angles of the light beams 11, 12a, 12b, 12c, and 12d respectively from the direction of the light beam 6 and from the incident angles of the light beams 2a, 2b, 2c, and 2d in accordance with the degrees of change in inclination of the interference fringes. In the case where the wavelengths of the light beams 11 and 12a to 12d are different from those of the light beams 6 and 2a to 2d in FIG. 21, the incident angles of the light beams 11 and 12a to 12d are deviated in advance respectively from the direction of the light beam 6 and from the incident angles of the light beams 2a to 2d in accordance with the degrees of difference in wavelength. In the method as described above, the incident angles of the light beams 2a to 2d which should be combined are fixed, and the incident angles of the light beams 11 and 12a to 12d used for making the hologram 5 are adjusted. However, it is possible to adjust the direction of the light beam 6 and the incident angles of the light beams 2a to 2d in accordance with the incident angles of the light beams 11 and 12a to 12d.

As the holographic recording material 10, it is possible to use any known material such as a silver halide photosensitive material. However, dichromated gelatin should perferably be used since a high diffraction efficiency is obtained thereby. It was found that, when dichromated gelatin is used as the holographic recording material 10 and is subjected to the development processing, a hologram free from absorption is obtained and it is possible to obtain a high diffraction efficiency up to approximately 70%.

Accordingly, when a hologram which exhibits a diffraction efficiency of 70% is obtained by use of dichromated gelatin and is used as the hologram 5 in FIG. 21, since four light beams 2a to 2d are combined, the light power of the light beam 6 obtained by the combination becomes 2.8 times the light power obtained by using a single light source if the light sources 1a to 1d exhibit the same level of power. Also, in the case where each of the light beams 2a to 2d is one obtained by combining two light beams emitted by two light sources by a known method using a polarization beam splitter or the like, the light power of the light beam 6 becomes 5.6 times the light power obtained when a single light source is used.

Further, even when light emitting diodes exhibiting low monochromaticity are used as the light sources 1a to 1d, since the hologram 5 has excellent wavelength selectivity, it is possible to easily obtain a light beam exhibiting high monochromaticity by the combining method.

Figure 23:
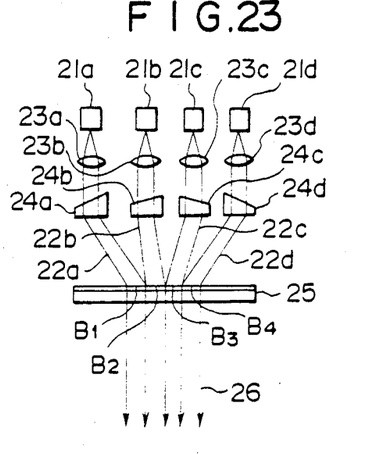
FIG. 23 is a schematic view showing another embodiment of the light beam combining apparatus in accordance with the present invention.

FIG. 23 schematically shows another embodiment of the light beam combining apparatus in accordance with the present invention, wherein an area division type hologram is used as a hologram 25. Four light beams 22a to 22d emitted by light sources 21a to 21d are respectively passed through collimator lenses 23a and 23d and beam direction adjusting prisms 24a to 24d. Then, the light beams 22a to 22d are caused to impinge upon adjacent regions B1, B2, B3, and B4 of the hologram 25, and are diffracted by the hologram 25, thereby constructing a combined collimated light beam group 26.

The area division type hologram 25 is made by generating interference fringes in the regions B1, B2, B3, and B4 of a holographic recording material in the same manner as shown in FIG. 22 by use of pairs of light beams corresponding to the light beams 26 and 22a, the light beams 26 and 22b, the light beams 26 and 22c, and the light beams 26 and 22d. Thus the regions B1 to B4 are exposed to the interference fringes and then are subjected to a development processing.

In general, the area division type hologram 25 exhibits a diffraction efficiency higher than that of the multiple type hologram. It was found that, when the area division type hologram 25 is a transmission type phase grating or hologram obtained by using dichromated gelatin as the holographic recording material, it is possible to obtain a diffraction efficiency of approximately 80%. Accordingly, when the four light beams 22a to 22d having the same level of light power are combined by use of the area division type hologram 25, it is possible to obtain a combined light beam group 26 having light power 3.2 times the light power of each of the light beams 22a to 22d. Also, in the case where each of the light beams 22a to 22d is one obtained by combining two light beams by a known light beam combining means such as a polarization beam splitter, it is possible to obtain a combined light beam group 26 exhibiting light power 6.4 times the light power of each of the original light beams.

It should be understood that the present invention can be embodied in various types other than the above described embodiments.

Figure 24:
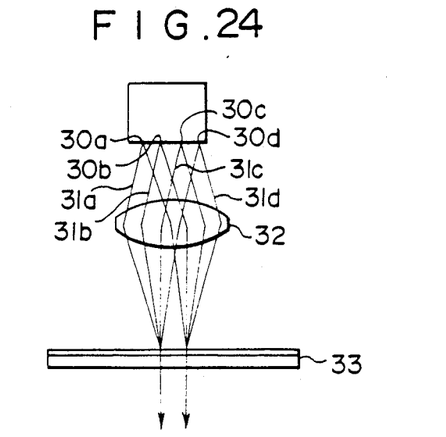
FIGS. 24 and 25 are schematic views showing modified forms of the embodiments of the light beam combining apparatus in accordance with the present invention.

For example, as shown in FIG. 24, it is possible to use one-dimensionally or two-dimensionally arrayed laser diodes or arrayed light emitting diodes 30a to 30d as the light sources, and to guide light beams 31a to 31d emitted by the diodes 30a to 30d to a hologram 33 by use of a single collimator lens 32. (In FIG. 24, the hologram 33 is of the multiple type but it is of course possible to use an area division type instead. In this case, since the light sources are arrayed, the light source system becomes small. Also, since a single collimator lens is used, the apparatus becomes smaller than the aforesaid embodiments.

Further, in the embodiments of FIGS. 21 and 23, the light beams collimated by the collimator lenses are deflected respectively by use of the prisms and guided to the hologram. However, the light beams collimated by the collimator lenses may directly be guided to the hologram without passing through the prisms. It is also possible to deflect some light beams by use of the prisms and to directly guide the other light beams to the hologram.

It is also possible to use light sources which emit parallel rays of light, such as gas lasers. In this case, the collimator lenses become unnecessary.

Figure 25:
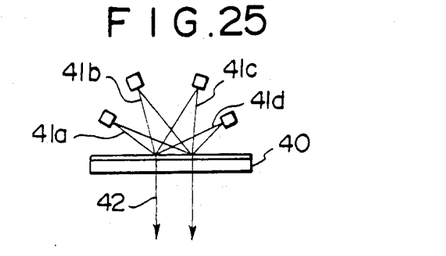

Also, in the embodiments of FIGS. 1 and 3, the light beams which should be combined are caused to impinge upon the hologram in the form of parallel rays. However, the light beams need not necessarily be in the form of parallel rays when impinging upon the hologram. For example, as shown in FIG. 25, the light beams may be caused to impinge upon a hologram 40 in the form of diverging beams, thereby obtaining a collimated combined light beam 42. In this case, too, the hologram 40 can be made by generating interference fringes in a holographic recording material by use of light beams corresponding to pairs of the collimated combined light beam 42 and each of divergent light beams 41a, 41b, 41c, and 41d impinging upon the hologram 40. Thus the holographic recording material is exposed to the interference fringes and is subjected to a development processing. (Though the hologram 40 is of the multiple type, the area division type may be used instead.)

In the aforesaid embodiments and the modified forms thereof, transmission type holograms are used. Of course, it is also possible to use reflection type holograms which can be made easily by using a known method such as a photographic process.

Further, in the aforesaid embodiments and the modified forms thereof, collimated light beams constituted of parallel rays are obtained. However, it is of course possible to obtain a diverging light beam or beams or a converging light beam or beams as a result of combination. When the light beam combining method of the present invention is used in an optical scanning apparatus and a converging light beam is obtained by the combination or merging, it becomes possible to reduce the number of components of the optical system for converging the light beam. Also, the hologram may be positioned on a substrate comprising a lens such as a planoconvex lens. In this case, too, it becomes possible to reduce the number of components of the optical system.

I claim:

1. A method of combining a plurality of light beams comprising a step of diffracting a plurality of first light beams into a group of second light beams, said second light beams being collimated light beams that advance in parallel to each other in one of partly merged and adjacent fashion, wherein said step of diffracting is performed using an area division type holographic diffraction grating (25),
whereby a high intensity beam for scanning a recording medium can be obtained from said second light beams.

2. A method of combining a plurality of light beams as defined in claim 1 wherein said plurality of first light beams are collimated light beams respectively.

3. A method of combining a plurality of light beams as defined in claim 1 wherein said plurality of first light beams are converging, light beams respectively.

4. A method of combining a plurality of light beams as defined in claim 1 wherein said pluraliy of first light beams are diverging light beams respectively.

5. A method for combining a plurality of light beams as defined in claim 1, wherein said diffraction grating has a diffraction surface, and said step of diffracting said first light beams includes directing said first light beams at different respective areas of said diffraction surface.

6. A method for combining a plurality of light beams as defined in claim 5, further comprising the step of forming said first light beams from pairs of third beams by use of a polarization beam splitter.

7. An apparatus for combining a plurality of light beams comprising a plurality of light sources, and an area division type holographic diffraction grating for diffrating a plurality of first light beams emitted by said light sources and incident to said diffraction grating into a group of second light beams, said second light beams being collimated light beams that advance in parallel to each other in one of partly merged and adjacent fashion, whereby a high intensity beam for scanning a recording medium can be obtained from said second light beams.

8. An apparatus as defined in claim 7, wherein said diffraction grating has a diffraction surface, and said first light beams are incident to said diffraction grating at different respective areas of said diffraction surface.

9. An optical scanning apparatus for scanning a surface of a recording medium (9), said apparatus comprising:
(a) a plurality of light sources ($1a$–$1d$) for emitting a plurality of first light beams ($2a$–$2d$);
(b) an area division type holographic diffraction grating (5) for diffracting said first light beams incident to said diffraction grating into a group of second light beams (6), said second light beams being collimated light beams that advance in parallel to each other in one of partly merged and adjacent fashion; and
(c) means (7) for deflecting said second light beams at a predetermined angular velocity,
whereby said second light beams can be used to scan the surface of the recording medium.

10. An optical scanning apparatus according to claim 9, further comprising means ($4a$–$4d$) for directing said first light beams at desired incident angles to said holographic diffraction grating.

11. An optical scanning apparatus according to claim 9, further comprising means ($3a$–$3d$) for shaping said first light beams as desired.

12. An optical scanning apparatus according to claim 9, wherein said diffraction grating has a diffraction surface, and said first light beams are incident to said diffraction grating at different respective areas of said diffraction surface.

* * * * *